US012458734B2

(12) United States Patent
Chang et al.

(10) Patent No.: US 12,458,734 B2
(45) Date of Patent: Nov. 4, 2025

(54) SILK FIBROIN/HYDROXYAPATITE COMPOSITE MATERIAL, AND PREPARATION METHOD THEREFOR AND APPLICATION THEREOF

(71) Applicant: Hubei Sailuo Biological Material Co., Ltd, Hubei (CN)

(72) Inventors: Chunyu Chang, Hubei (CN); Lin Wu, Hubei (CN); Yu Pan, Hubei (CN); Jiehan Lin, Hubei (CN)

(73) Assignee: Hubei Sailuo Biological Material Co., Ltd, Wuhan (CN)

( * ) Notice: Subject to any disclaimer, the term of this patent is extended or adjusted under 35 U.S.C. 154(b) by 101 days.

(21) Appl. No.: 18/282,535

(22) PCT Filed: Mar. 9, 2022

(86) PCT No.: PCT/CN2022/079918
§ 371 (c)(1),
(2) Date: Sep. 17, 2023

(87) PCT Pub. No.: WO2022/242272
PCT Pub. Date: Nov. 24, 2022

(65) Prior Publication Data
US 2024/0181138 A1    Jun. 6, 2024

(30) Foreign Application Priority Data
May 20, 2021   (CN) .......................... 202110553568.6

(51) Int. Cl.
*A61L 31/12*        (2006.01)
*A61L 31/14*        (2006.01)

(52) U.S. Cl.
CPC .......... *A61L 31/127* (2013.01); *A61L 31/148* (2013.01); *A61L 2400/12* (2013.01); *A61L 2430/02* (2013.01)

(58) Field of Classification Search
CPC ... A61B 17/86; A61B 17/8605; A61B 17/861; A61B 17/8615; A61B 17/862;
(Continued)

(56) References Cited

U.S. PATENT DOCUMENTS 9,181,636 B2 * 11/2015 Arinzeh .................. A61L 27/46
9,925,301 B2 * 3/2018 Kaplan ............... A61L 27/3821
(Continued)

FOREIGN PATENT DOCUMENTS

CN       104707183 A     6/2015
CN       106667595 A     5/2017
(Continued)

OTHER PUBLICATIONS

European Patent Office, English abstract for CN113332498A, printed on Aug. 2, 2023.
(Continued)

*Primary Examiner* — Eric S Gibson
(74) *Attorney, Agent, or Firm* — Cahn & Samuels, LLP

(57) ABSTRACT

The present invention relates to a silk fibroin/hydroxyapatite composite material, and a preparation method therefor and an application thereof. A uniform mixture of hydroxyapatite nanoparticles, silk fibroin, and hexafluoroisopropanol is maintained at a temperature range from 50° C. to 60° C. for at least 1 hour to obtain a silk fibroin/hydroxyapatite solution; the silk fibroin/hydroxyapatite solution is poured into a long cylindrical mold, two ends of the long cylindrical mold being respectively an end A and an end B; at room temperature, the end A is opened and the end B is closed, and the mold is vertically immersed in methanol with the opening facing up and let stand for at least 2 days; the mold is turned upside down, the end A is closed and the end B is opened, and the mold is vertically immersed in the methanol with the opening facing up and let stand for at least 2 days;
(Continued)

the mold is removed, and ventilation and drying are performed to obtain a silk fibroin/hydroxyapatite composite material. The silk fibroin/hydroxyapatite composite material prepared in the present invention has uniform strength, good mechanical properties, and significant osteoinductivity.

11 Claims, 4 Drawing Sheets

(58) Field of Classification Search
CPC .............. A61B 17/8625; A61B 17/863; A61B 17/8635; A61B 17/864; A61B 17/8645; A61B 17/866; A61L 27/58; A61L 31/127; A61L 31/148; A61L 2400/12; A61L 2430/02

See application file for complete search history.

(56) References Cited

U.S. PATENT DOCUMENTS

| | | | | |
|---|---|---|---|---|
| 11,046,737 | B2* | 6/2021 | Nisal | A61K 8/025 |
| 11,247,181 | B2* | 2/2022 | Kaplan | B01D 69/1218 |
| 2011/0046686 | A1* | 2/2011 | Kaplan | A61L 27/46 |
| | | | | 606/86 R |
| 2015/0165092 | A1* | 6/2015 | Kaplan | A61L 27/56 |
| | | | | 424/94.1 |
| 2018/0273592 | A1* | 9/2018 | Nisal | A61L 27/227 |
| 2020/0054792 | A1* | 2/2020 | Omenetto | A61L 27/227 |
| 2021/0138071 | A1* | 5/2021 | Santos | A61K 38/47 |
| 2021/0236644 | A1* | 8/2021 | Santos | A61K 47/10 |
| 2024/0181138 | A1* | 6/2024 | Chang | A61L 27/46 |

FOREIGN PATENT DOCUMENTS

| | | | | |
|---|---|---|---|---|
| CN | 107041972 | A | 8/2017 | |
| CN | 107670115 | A * | 2/2018 | |
| CN | 108159501 | A * | 6/2018 | |
| CN | 110101917 | A * | 8/2019 | ............. A61L 27/12 |
| CN | 113332498 | A | 9/2021 | |
| WO | WO-2013152265 | A1 * | 10/2013 | ......... A61L 27/3604 |
| WO | WO-2016110873 | A1 * | 7/2016 | ............. A61K 8/025 |
| WO | WO-2017019841 | A1 * | 2/2017 | ........... A61K 9/5052 |
| WO | WO-2019094700 | A1 * | 5/2019 | ............. A01K 67/04 |
| WO | WO-2019094702 | A1 * | 5/2019 | ............. A61K 31/415 |
| WO | WO-2020247594 | A1 * | 12/2020 | ............... A61K 8/64 |

OTHER PUBLICATIONS

European Patent Office, English abstract for CN108159501A, printed on Aug. 2, 2023.
European Patent Office, English abstract for CN106667595A, printed on Sep. 17, 2023.
European Patent Office, English abstract for CN104707183A, printed on Sep. 17, 2023.
European Patent Office, English abstract for CN1070411972A, printed on Sep. 17, 2023.
China National Intellectual Property Administration, International Search Report for PCT App. No. PCT/CN2022/079918, pp. 1-3.
China National Intellectual Property Administration, Written Opinion for PCT App. No. PCT/CN2022/079918, pp. 1-4.

* cited by examiner

SILK FIBROIN/HYDROXYAPATITE COMPOSITE MATERIAL, AND PREPARATION METHOD THEREFOR AND APPLICATION THEREOF

I. FIELD OF THE INVENTION

The present invention belongs to the fields of material science and clinical medicine, and relates to a silk fibroin/hydroxyapatite composite material and a preparation method therefor and an application thereof.

II. BACKGROUND OF THE INVENTION

Fracture refers to the partial or total interruption or loss of the integrity or continuity of bone or cartilage tissue when the bone or cartilage tissue is subjected to violent action, and deformity, dysfunction, and abnormal activity are typical symptoms of the disease. Complications such as shock may occur in patients with severe fractures, which may even be life-threatening. Treatment is generally performed through surgical implantation of fracture fixation materials. An ideal bone repair material should have the following characteristics: (1) biocompatibility: it can be directly combined with bone without preventing the normal activity of bone cells on its surface or interfering with the natural regeneration process of bone cells around it; (2) mechanical tolerance: the compressive modulus of human cortical bone material should be at least not less than 45 MPa; (3) biodegradability: it can be degraded by itself after a certain period of time in the human body and can be metabolized by the host body, without the need for secondary surgery to remove; and (4) induced regenerative properties: bone growth is stimulated or induced through the material itself or through adding osteoinductive factors.

At present, the fracture internal fixation materials mainly comprise metal type, ceramic type and degradable polymer type. Although the metal-type fracture internal fixation materials have good mechanical properties, due to the stress shielding effect of the metal-type fracture internal fixation materials, it is easy to induce the appearance of osteoporosis symptoms at the fracture site, resulting in slow fracture healing. Although the ceramic-type fracture internal fixation materials have the advantages of being gradually converted into natural components by the human body, the disadvantages of high brittleness, stress concentration and overload sensitivity are existed, which limits the application thereof. At present, the degradable polymer fracture internal fixation materials used in the market are mainly polylactic acid, but a large amount of lactic acid produced by the degradation of polylactic acid can have a certain degree of corrosiveness to bone tissue, so the polylactic acid is prone to cause local inflammatory reactions at the repair site. At present, this field still needs to develop a fracture internal fixation material with excellent mechanical properties, good biocompatibility, and a safe and environmentally friendly synthesis process to meet clinical needs.

Silk protein is a natural polymer fibrous protein extracted from silk, which accounts for about 70 wt % to 80 wt % of the silk and contains 18 kinds of amino acids. Silk protein itself has good mechanical properties and physical and chemical properties, and has excellent biocompatibility with the human body. After being degraded by the human body, silk protein materials are amino acids and polypeptides, which are non-toxic to the human body. Most of the products using the silk fibroin as one of the raw materials have excellent biocompatibility, so the silk fibroin is widely used in the field of biomedical research. However, the water solubility of silk fibroin solution is not good, and a large amount of silk fibroin solution is prone to gelation in organic solvents, resulting in structural changes. Therefore, the preparation of silk fibroin materials has certain requirements on the production process.

Hydroxyapatite (HAP) is the main inorganic component of vertebrate bones and teeth, which accounts for about 69 wt % in human bones. Experiments have proved that HAP particles have good biocompatibility and high affinity with the bone, and the mineralization solution thereof can effectively form remineralization deposits and prevent the loss of calcium ions. Adding hydroxyapatite nanoparticles (nHA) to bone repair products can not only increase the mechanical properties of the products, but also improve the biocompatibility of the products. The Chinese Patent No. CN108159501A discloses a preparation method of a silk fibroin material of composite nano-scale hydroxyapatite and application of the material in repairing bone fracture parts. The method is to uniformly disperse nano-scale hydroxyapatite into silk fibroin in a certain proportion, dissolve them with hexafluoroisopropanol, pour a mixed solution into a cylindrical mold, soak with methanol to make silk fibroin molecular chains perform self-assembling regeneration so as to obtain a composite material which is excellent in mechanical strength, and finally manufacture medicinal bone screws (nails) from the composite material by means of a mechanical processing method. However, it is difficult to process the silk fibroin material with composite nano-hydroxyapatite in the Patent No. CN108159501A into large-sized bone screws.

III. SUMMARY OF THE INVENTION

Aiming at the problem that the existing silk fibroin/hydroxyapatite composite material cannot be processed into the large-size bone screws, the inventor conducts in-depth research and finds that the mechanical properties of large-sized silk fibroin/hydroxyapatite composite materials are insufficient and cannot be processed into large-sized bone screws due to the uneven dispersion of hydroxyapatite in the large-sized silk fibroin/hydroxyapatite composite materials.

The technical solution provided by the present invention is specifically as follows:

In a first aspect, a preparation method of a silk fibroin/hydroxyapatite composite material is provided, which comprises the following steps:

(1) maintaining a uniform mixture of hydroxyapatite nanoparticles, silk fibroin, and hexafluoroisopropanol at a temperature range from 50° C. to 60° C. for at least 3 hours to obtain a viscous silk fibroin/hydroxyapatite solution;

(2) pouring the silk fibroin/hydroxyapatite solution into a long cylindrical mold; and two ends of the long cylindrical mold being, respectively, an end A and an end B;

(3) at room temperature, making the end A opened and the end B closed, vertically immersing the mold in methanol with the opening facing up and letting the mold stand for at least 2 days; and turning the mold upside down, making the end A closed and the end B opened, vertically immersing the mold in the methanol with the opening facing up and letting the mold stand for at least 2 days; and (4) removing the mold, and performing ventilation and drying to obtain a silk fibroin/hydroxyapatite composite material.

On the basis of the above technical solution, the uniform mixture is prepared by the following method:
(i) mixing the hydroxyapatite nanoparticles and silk fibroin, evenly dispersing them in the hexafluoroisopropanol, and maintaining them at a temperature range from 50° C. to 60° C. for at least 0.5 hour; and
(ii) performing the following operation at least once: adding the hydroxyapatite nanoparticles, silk fibroin, and hexafluoroisopropanol in equal proportion to in step (i), and maintaining them at a temperature range from 50° C. to 60° C. for at least 0.5 hour after mixing.

As a preferred option of the above technical solution, the hydroxyapatite nanoparticles account for 25 wt % to 35 wt % of the total amount of the hydroxyapatite nanoparticles and silk fibroin.

As a preferred option of the above technical solution, the hydroxyapatite nanoparticles account for 31 wt % of the total amount of the hydroxyapatite nanoparticles and silk fibroin.

As a preferred option of the above technical solution, a particle size of the nano-scale hydroxyapatite is 60 nm to 80 nm; and a particle size of the silk fibroin is 0.1 mm to 1.5 mm.

As a preferred option of the above technical solution, the temperature in step (1) is 55° C.

As a preferred option of the above technical solution, the total amount of the hydroxyapatite nanoparticles and silk fibroin added per 100 ml of the hexafluoroisopropanol is 30 g to 40 g.

In a second aspect, a silk fibroin/hydroxyapatite composite material prepared through the preparation method of the silk fibroin/hydroxyapatite composite material is provided, the material can be degraded into non-toxic substances in the body, and has biocompatibility and osteoinductivity, and thanks to the uniformity and morphology of the material, the silk fibroin/hydroxyapatite composite material forms a rod with a length of up to 200 mm, and the rod has excellent mechanical properties and can be further processed into fracture repair parts.

In a third aspect, the application of the silk fibroin/hydroxyapatite composite material in the preparation of bone repair parts is provided, on the basis of the above technical solution, the silk fibroin/hydroxyapatite composite material is performed machining to produce a screw with a length of 4 mm to 150 mm.

The principle of the present invention is specifically as follows.

The hydroxyapatite nanoparticles are easily aggregated in the hexafluoroisopropanol, resulting in micron-scale dispersion of the hydroxyapatite in the silk fibroin/hydroxyapatite composite material, so the present invention maintains the uniform mixture of hydroxyapatite nanoparticles, silk fibroin and hexafluoroisopropanol at a temperature range from 50° C. to 60° C. for at least 1 hour before pouring the mixture into a mold, on the one hand, the hydroxyapatite is ensured to be fully dissolved before pouring the mixture into the mold, without agglomeration or precipitation, and on the other hand, the gelation of the silk fibroin due to too low temperature is avoided, thereby preparing a silk fibroin/hydroxyapatite solution in which the hydroxyapatite nanoparticles and silk fibroin are uniformly dispersed and fully dissolved.

During the molding process, the hydroxyapatite occurs the phenomenon of sinking under the action of gravity, which causes uneven distribution in the silk fibroin/hydroxyapatite composite material, leads to uneven strength and poor mechanical properties of the silk fibroin/hydroxyapatite composite material, and finally makes it unable to be processed into large-sized bone repair parts. In the present invention, the mold is turned upside down during the material molding process, which avoids the problem that the hydroxyapatite is not uniformly dispersed in the rod due to the deposition of the hydroxyapatite to one end of the rod due to the action of gravity, which affects the mechanical properties of the rod.

In the prior art, it is generally believed that the composition of hydroxyapatite is similar to that of human bone, which can induce the growth of bone cells and promote the recovery of bone defects in patients, without considering the effect of internal pores of the material on bone induction. The present invention adopts a long cylindrical mold to make methanol replace the hexafluoroisopropanol in the material from top to bottom along the mold, and preliminarily obtain regular internal pores, after the rod is initially formed, the mold is turned upside down, the methanol enters the mold from the other end and replaces the hexafluoroisopropanol in the material from top to bottom, thereby obtaining the regular internal pores for bone cells to grow in, with obvious osteoinductivity.

Compared with the prior art, the present invention has the following advantages and beneficial effects:

The hydroxyapatite/silk fibroin composite material (nHA/SF) prepared by the present invention can be prepared into bone screws up to 150 mm long, with a three-point bending maximum deformation force of 171.73 N and a tensile fracture strength of 112.2 MPa, and both the bending strength and tensile fracture strength have greatly exceeded the PLA bone screws of the same specification, which solves the problem that the existing hydroxyapatite/silk fibroin composite materials cannot be used to prepare bone screws longer than 4 mm.

(2) The hydroxyapatite/silk fibroin composite material (nHA/SF) prepared by the present invention has regular-shaped pores with diameters of 2 μm to 10 μm, which can allow the bone cells to grow in, and with the degradation of the material and the growth of the bone cells, the pores will be further enlarged, allowing more bone cells to grow in, resulting in significant bone induction.

IV. BRIEF DESCRIPTION OF THE DRAWINGS

In order to better illustrate the technical solution in the embodiments of the present application, the following will briefly introduce the drawings needed in the description of the embodiments, and it is obvious that the drawings in the following description are only a part of embodiments of the present application, for those of ordinary skill in the art, other drawings may also be obtained based on these drawings without any inventive effort.

FIGS. 3A and 3B are photos of a rod and a bone screw respectively, prepared in the embodiment 1 of the present invention; wherein FIG. 3A is the rod, and FIG. 3B is the bone screw.

Figure 4:
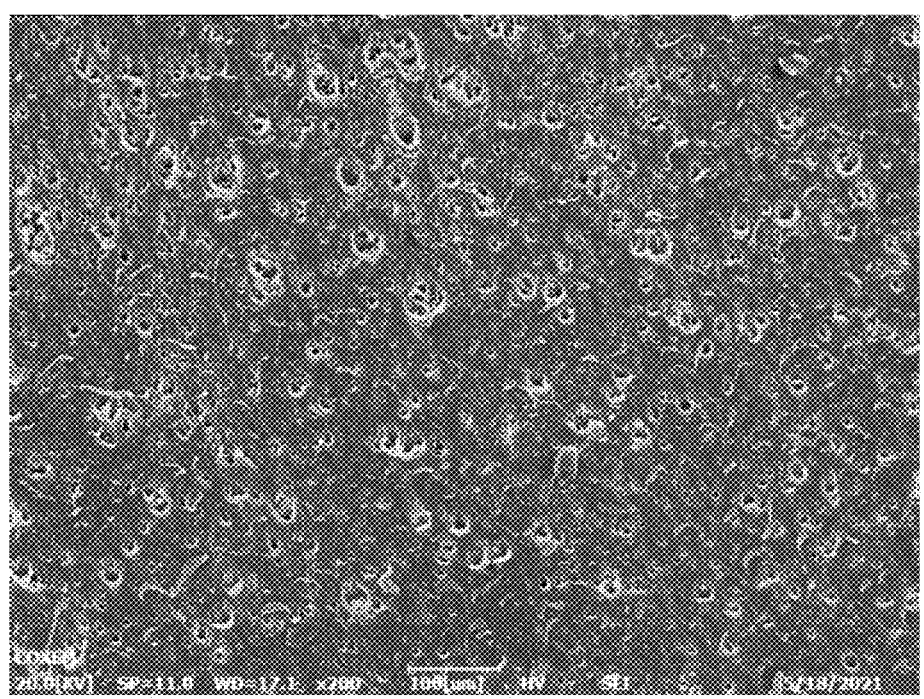

Please replace paragraph [0057] with the following new paragraph (Table 1 has not been reproduced):

FIG. 4 is a 200×SEM image of a cut surface of a silk fibroin/hydroxyapatite composite material prepared in the embodiment 1 of the present invention.

Figure 5:
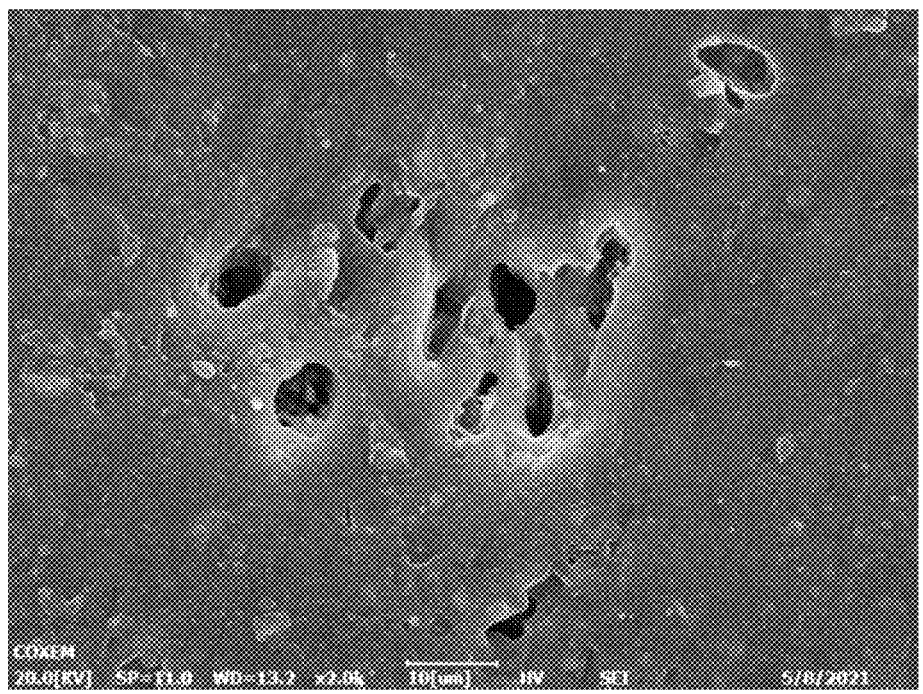

FIG. 5 is a 2000×SEM image of a cut surface of a silk fibroin/hydroxyapatite composite material prepared in the embodiment 1 of the present invention.

Figure 6:
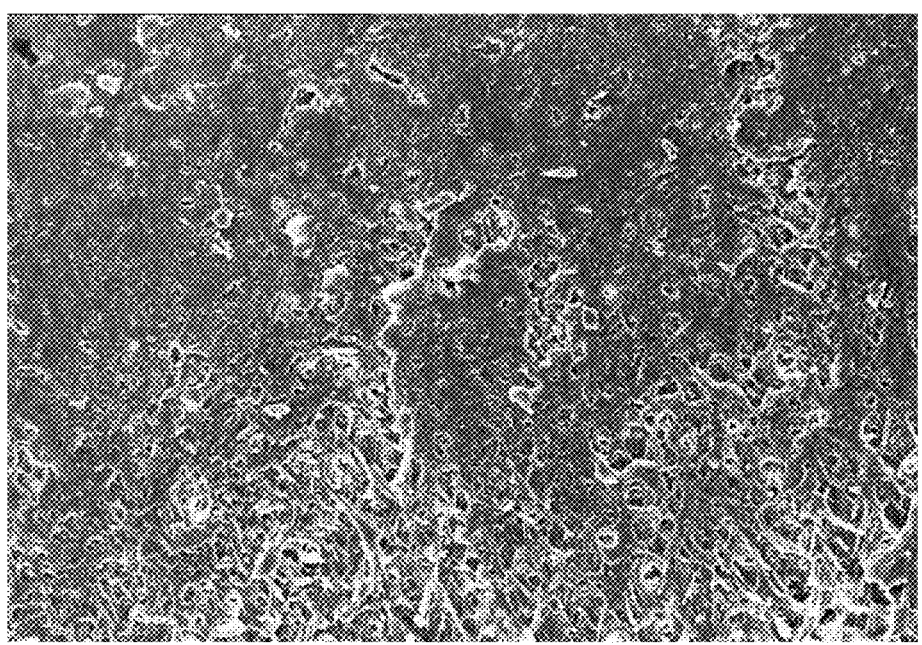

FIG. 6 is a 200×SEM image of a cut surface of a silk fibroin/hydroxyapatite composite material prepared in the comparative embodiment 2 of the present invention.

Figure 7:
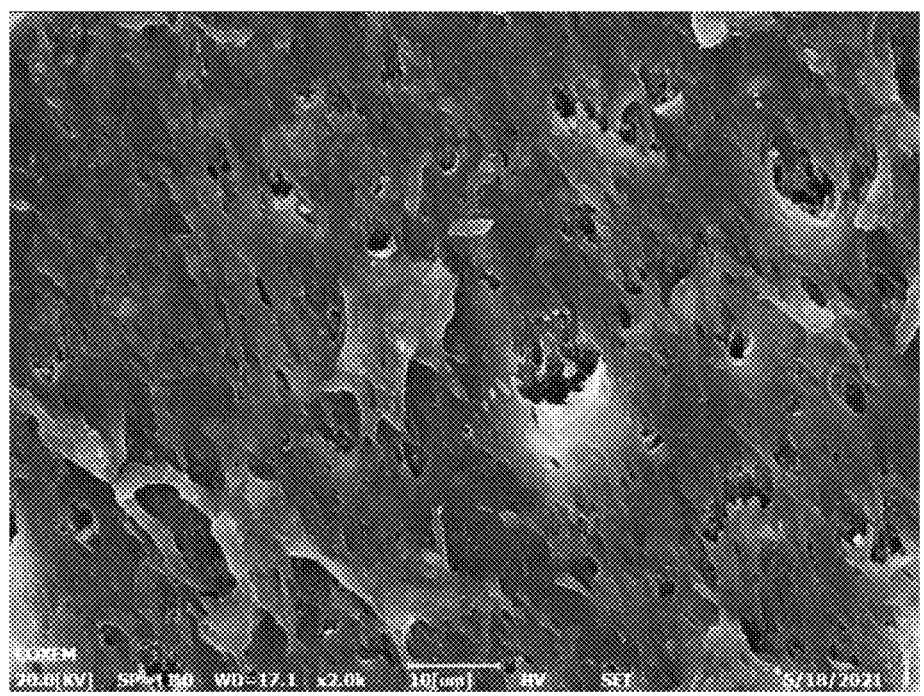

FIG. 7 is a 2000×SEM image of a cut surface of a silk fibroin/hydroxyapatite composite material prepared in the comparative embodiment 2 of the present invention.

V. DETAILED DESCRIPTION OF THE EMBODIMENTS

In order to make the purpose, technical solutions and advantages of the embodiments of the present invention clearer, the technical solutions in the embodiments of the present invention will be described clearly and completely in combination with the drawings in the embodiments of the present invention. Obviously, the described embodiments are only a part of the embodiments of the present invention, not all of the embodiments. Based on the embodiments in the present invention, all other embodiments obtained by a person of ordinary skill in the art without inventive efforts shall fall within the protection scope of the present invention.

The technical solution provided by the embodiments of the present invention is specifically as follows.

(1) A small amount of silk fibroin powder is taken and the hydroxyapatite nanoparticles are evenly mixed into the silk fibroin powder, wherein the hydroxyapatite nanoparticles account for 25 wt % to 35 wt % of the total amount of the hydroxyapatite nanoparticles and silk fibroin; and the hydroxyapatite nanoparticles and silk fibroin are evenly dispersed in the hexafluoroisopropanol, and let stand in an oven at a temperature of 50° C. to 60° C. for 0.5 h to 5 h to completely dissolve the hydroxyapatite nanoparticles and silk fibroin;

(2) The solution is taken out and added equal proportions of hydroxyapatite nanoparticles, silk fibroin powder and hexafluoroisopropanol, and the solution is kept standing in the oven at a temperature of 50° C. to 60° C. for 0.5 h to 5 h after mixing uniformly; and this step is repeated 2 to 5 times to obtain a sufficient amount of mixture of hydroxyapatite nanoparticles, silk fibroin powder, and hexafluoroisopropanol;

(3) After stirring the mixture of hydroxyapatite nanoparticles, silk fibroin powder, and hexafluoroisopropanol, the mixture is kept baking in the oven at a temperature of 50° C. to 60° C. for 3 h to 24 h to ensure that air bubbles are further completely removed, and the mixture are mixed evenly so as to obtain a viscous silk fibroin/hydroxyapatite solution;

(4) Molding: the silk fibroin/hydroxyapatite solution is poured into a specially customized long cylindrical mold at a temperature of 50° C. to 60° C., the two ends of the long cylindrical mold are end A and end B, respectively, and both ends can be opened; at room temperature, the end A is opened, the end B is closed, the mold is vertically immersed in the methanol with the opening facing up and let stand for 2 to 10 days so as to make the hexafluoroisopropanol gradually transfer to the methanol from the upper opening; and then the mold is turned upside down, the end A is closed, the end B is opened, the mold is vertically immersed in the methanol with the opening facing up and let stand for at least 2 days so as to make the hexafluoroisopropanol gradually transfers to the methanol from the upper opening; and (5) After performing ventilation and drying on the formed cylindrical solid material, a silk fibroin/hydroxyapatite composite material rod is obtained and performed machining.

The present invention adopts the method of adding small amount and quantitatively adding multiple times in batches to add hydroxyapatite nanoparticles and silk fibroin multiple times, and uses a mixer for a plurality of times to mix evenly, so that the hydroxyapatite nanoparticles are evenly dispersed in the silk fibroin powder before dissolving, and the temperature is maintained at 55° C. during pouring the mixture into the mold and other related operations after dissolving to ensure that the solids are fully dissolved before pouring the mixture into the mold, this series of operations effectively prevents the silk fibroin from gelling at low temperature, agglomeration and precipitation of the hydroxyapatite, and degradation of mechanical properties of rods caused by uneven dispersion of the hydroxyapatite. Only under the premise of ensuring that there is no gelation of the silk fibroin and agglomeration and precipitation of the hydroxyapatite, and with sufficient mechanical properties, can the turning device successfully turn the rod into a screw with a length of more than 40 mm, which solves the problem that the existing silk fibroin/hydroxyapatite composite material is difficult to make the screw longer and larger due to the unevenness of its own material.

The present invention adopts a specially customized long cylindrical mold during the rod molding process, and both ends of the mold can be opened and closed. The mold is placed vertically in the methanol with the opening facing up so as to ensure that the methanol replaces the hexafluoroisopropanol in the rod vertically from top to bottom, after letting stand for 2 to 10 days, one end of the rod is basically formed, and then the mold is turned upside down by 180°, the methanol enters the mold from the former bottom end, and continues to replace the hexafluoroisopropanol in the rod vertically from top to bottom. This process not only ensures that the formed rod is a completely vertical and hard rod, but also ensures that the density of the upper and lower ends of the formed rod is uniform through two-end molding, increasing the length of the rod. The maximum length of the rod prepared by this method can reach 150 mm, which can be used to produce longer bone screws so as to meet various clinical needs.

Unless otherwise specified, the embodiments and comparative embodiments of the present invention adopt the hydroxyapatite nanoparticles with particle sizes of 60 nm to 80 nm, and the silk fibroin is prepared by the following methods: the silkworm cocoons are crushed, ground, and degummed by boiling in an aqueous solution of sodium carbonate for 0.5 h; the dried silk is dissolved in the lithium bromide solution of 9.3 mol/L; the solution is dialyzed with distilled water for 3 days, and freeze-dried to obtain a white foamy silk fibroin sample; and the silk fibroin sample is pulverized with a pulverizer, and pulverized into silk fibroin powder with a particle size below 0.25 mm.

Embodiment 1

(1) 5 g of silk fibroin powder is taken, hydroxyapatite nanoparticles are added, and a vortex mixer and an ultrasonic oscillator are adopted to mix thoroughly. The hydroxyapatite nanoparticles account for 0 wt % to 40 wt % of the total amount of the hydroxyapatite nanoparticles and silk fibroin.

(2) 35 g of mixture of the hydroxyapatite nanoparticles and silk fibroin is added into per 100 mL of the hexafluoroisopropanol, the mixture of hydroxyapatite nanoparticles and silk fibroin powder is evenly dispersed in the hexafluoroisopropanol and let stand in an oven at 55° C. for 0.5 h to completely dissolve the hydroxyapatite nanoparticles and silk fibroin powder, and remove air bubbles, so as to obtain a uniform mixture of hydroxyapatite nanoparticles, silk fibroin and hexafluoroisopropanol.

(3) The uniform mixture is taken out of the oven, added 5 g of silk fibroin protein powder and the same amount of hydroxyapatite nanoparticles as in step (1), added the same amount of hexafluoroisopropanol as in step (2) after mixing uniformly, then kept standing in the oven at 55° C. for 0.5 h after mixing uniformly to obtain a uniform mixture of hydroxyapatite nanoparticles, silk fibroin and hexafluoroisopropanol; and this step is repeated 3 times to obtain a sufficient amount of completely dissolved uniform mixture.

(4) The mixture is let stand in the oven at 55° C. for another 2.5 h to ensure that the solution after mixing is completely mixed and the air bubbles are removed so as to obtain a viscous and uniform silk fibroin/hydroxyapatite solution.

(5) Molding: in an environment maintained at 55° C., the silk fibroin/hydroxyapatite solution is poured into a specially customized long cylindrical mold (made of polypropylene, with sealing caps on both ends of the mold, for easy understanding, the two ends of the mold are called end A and end B, respectively). At room temperature, the end A is opened, the end B is closed, and the mold is vertically immersed in methanol with the opening facing up and let stand for 5 days; and the mold is turned upside down 180°, the end A is closed, the end B is opened, the mold is vertically immersed in the methanol with the opening facing up and let the mold stand for 5 days.

(6) The mold is removed, the formed silk fibroin/hydroxyapatite composite material is air-dried, and finally machined into 45 mm semi-threaded screws.

Figure 1:
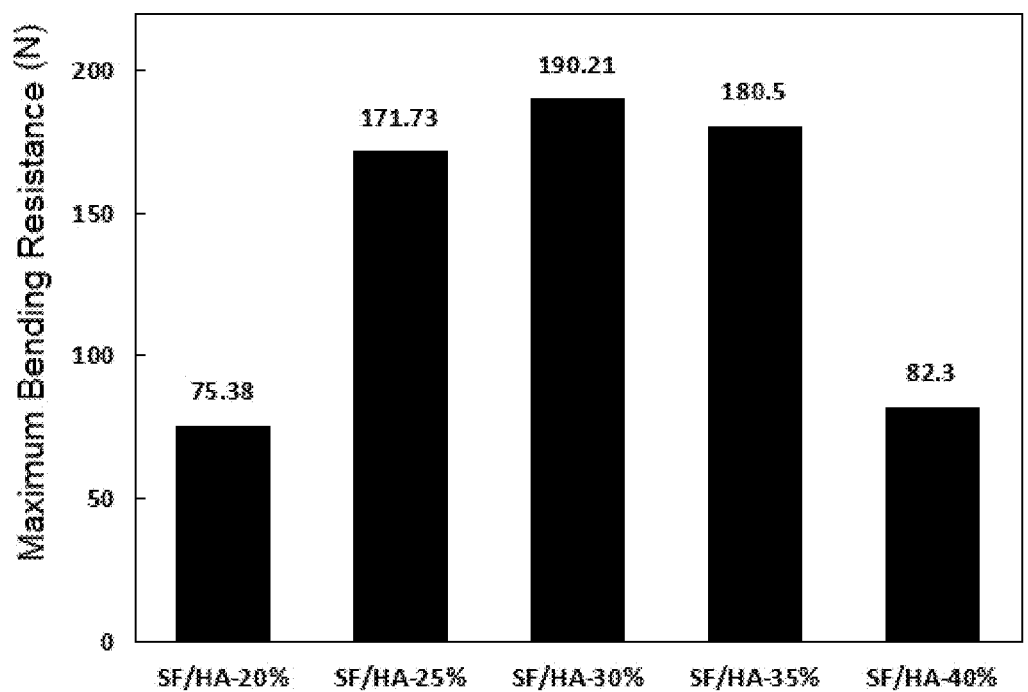
FIG. 1 shows a variation trend of a maximum bending resistance of a silk fibroin/hydroxyapatite composite material when a content of nHA varies from 0 wt % to 40 wt %.

When the content of nHA is 0 wt %, the air-dried silk fibroin/hydroxyapatite composite material is soft and cannot be successfully processed into screw products. FIG. 1 shows a variation trend of a maximum bending resistance of a silk fibroin/hydroxyapatite composite material when a content of nHA varies from 20 wt % to 40 wt %. As shown in FIG. 1, when the content of nHA is 20 wt %, the maximum bending resistance of the air-dried silk fibroin/hydroxyapatite composite material (SF/HA-20%) reached 75.38 N; when the content of nHA is 25 wt %, the maximum bending resistance of the air-dried silk fibroin/hydroxyapatite composite material (SF/HA-25%) reached 171.73 N; and when the content of nHA is 30 wt %, the maximum bending resistance of the air-dried silk fibroin/hydroxyapatite composite material (SF/HA-30%) reached 190.21 N, it can be seen that the mechanical properties of the silk fibroin/hydroxyapatite composite materials gradually increase with the increase of the content of nHA. However, when the content of nHA is 35 wt %, the mechanical properties of the air-dried silk fibroin/hydroxyapatite composite material (SF/HA-35%) decreased compared with that of SF/HA-30%, and the maximum bending resistance is 180.5 N, and when the content of nHA exceeds 35 wt %, the mechanical properties of the silk fibroin/hydroxyapatite composite material decline rapidly, and the maximum bending resistance of the silk fibroin/hydroxyapatite composite material (SF/HA-40%) with the content of nHA of 40 wt % is only 82.3 N, according to the analysis, it is because the excessive nHA aggregates in the SF matrix, which leads to a sharp decline in mechanical properties.

Figure 2:
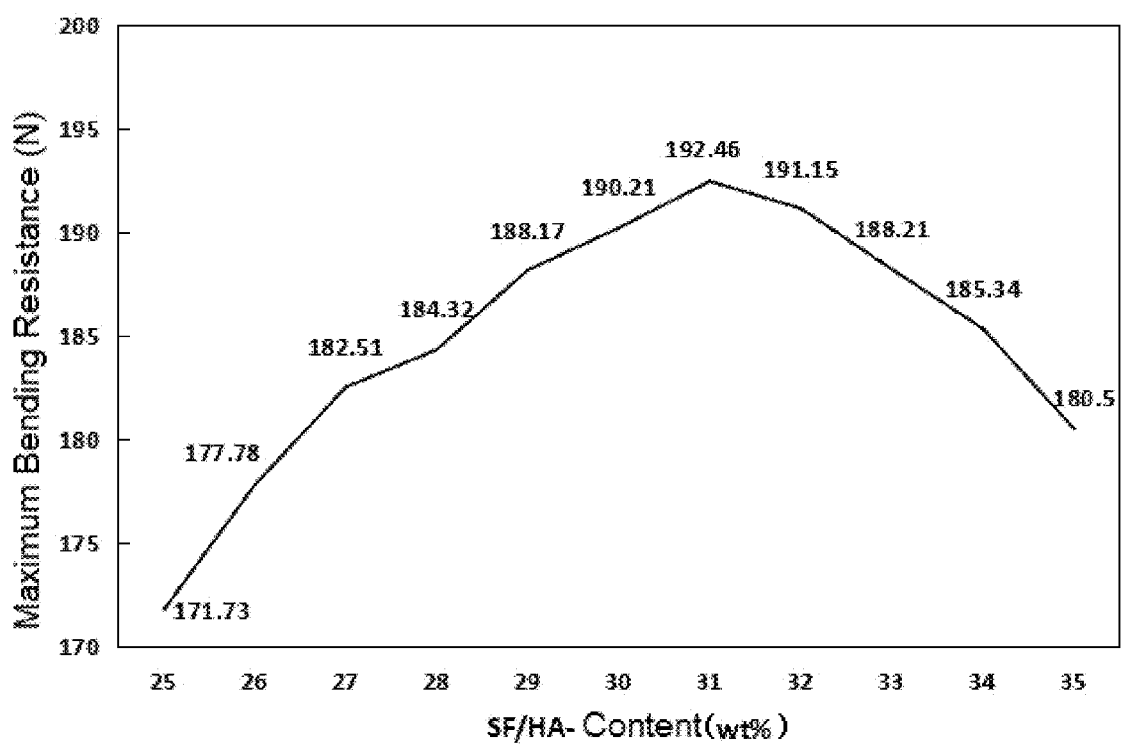
FIG. 2 shows a variation trend of a maximum bending resistance of a silk fibroin/hydroxyapatite composite material when a content of nHA varies from 25 wt % to 35 wt %.

On the basis of the above, the inventor further explores the content of nHA, and finds that when the content of nHA is 31 wt %, the air-dried silk fibroin/hydroxyapatite composite material (SF/HA-31%) can has the best maximum bending resistance, which is 192.46 N. FIG. 2 shows a variation trend of a maximum bending resistance of a silk fibroin/hydroxyapatite composite material when the content of nHA varies from 25 wt % to 35 wt %.

After that, the air-dried silk fibroin/hydroxyapatite composite material rods prepared by different proportions of nHA are turned, and it is found that when the content of nHA is less than 20 wt % or higher than 40 wt %, the mechanical properties of the silk fibroin/hydroxyapatite composite materials are not enough to make the large-sized screw with a length of more than 45 mm. Only the rod with the hydroxyapatite nanoparticles accounting for 25 wt % to 35 wt % of the total amount of the hydroxyapatite nanoparticles and silk fibroin can be successfully made into the bone screws with a length greater than 40 mm.

Figure 3A:
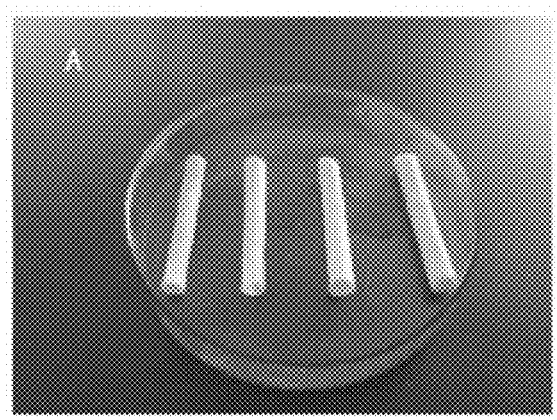
Figure 3B:
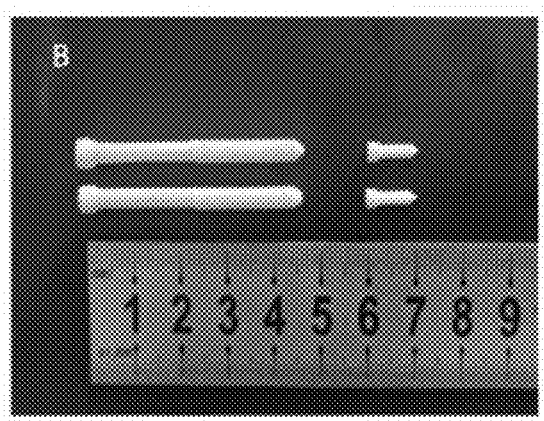

As shown in FIG. 3A, the rod (SF/HA-31%) prepared in the embodiment 1 is regular in shape, straight and cylindrical, easy to process, and can be made into small screws and elongated full-thread/semi-threaded screws according to the needs, and the rod (SF/HA-31%) prepared in the embodiment 1 is processed into bone screws of two specifications, referred to as SF/HA-31% screws, as shown in FIG. 3B. Table 1 shows the comparative parameters of the mechanical properties of the SF/HA-31% screw prepared in the embodiment 1 and the common PLA screw on the market.

TABLE 1

Performance Comparison of Bone Screws

| Sample Information | PLA Screw (45 mm semi-threaded) | nHA/SF-31% Screw (45 mm semi-threaded) | nHA/SF-31% Screw (10 mm semi-threaded) |
|---|---|---|---|
| Three-point Bending Maximum Deformation Force (N) | 75.51 | 171.73 | 102.34 |
| Yield Load (N) | 28.30 | 33.12 | 30.24 |
| Tensile Fracture Strength (MPa) | 77.2 | 112.2 | 65.4 |
| Torque (kgf · cm) | 0.92 | 1.22 | 0.86 |
| Peak Pullout Load (N) | 7.1 | 9.3 | 5.3 |

From Table 1, it can be seen that the nHA/SF-31% screw with a size of 45 mm has better mechanical properties than the PLA screw of the same size.

Embodiment 2

The rod (nHA/SF-31%) prepared in the embodiment 1 that the hydroxyapatite nanoparticles account for 31 wt % of the total amount of the hydroxyapatite nanoparticles and silk fibroin is taken, cut into powder, and performed Fourier infrared spectroscopy detection to study the mechanism of the silk fibroin performance enhancement after methanol treatment. The absorption peaks at 1658 cm$^{-1}$, 1545 cm$^{-1}$ and 1242 cm$^{-1}$ belonged to the characteristic absorption peaks of amide I, amide II and amide III of dry silk fibroin molecule (Silk), respectively, indicating that the secondary structure thereof is random coils; and after the methanol regeneration, the three characteristic peaks are shifted to 1634 $cm^{-1}$, 1520 $cm^{-1}$ and 1230 $cm^{-1}$, respectively, indicating that silk fibroin transforms from random coils to B-sheets, which is beneficial to increase the strength of the silk fibroin/hydroxyapatite composite material. In addition, in the infrared spectrum of the silk fibroin/hydroxyapatite composite material, the characteristic absorptions at 603 $cm^{-1}$ and 565 $cm^{-1}$ correspond to phosphate O—P—O bending vibrations, proving that the hydroxyapatite exists in the silk fibroin/hydroxyapatite composite material.

Embodiment 3

The nHA/SF-31% screw prepared in the embodiment 1 is taken and cultured at a rabbit ankle bone, and the degradation of the nHA/SF-31% screw is tracked. It is found that after 2 months of culture at the rabbit ankle bone, the gap between the nHA/SF-31% screw and the host bone tissue is significantly reduced, and inflammatory cells are also not observed during the degradation of nHA/SF-31% screw, indicating that the degradation products of the silk fibroin/hydroxyapatite composite material can be absorbed by the human body. It is found through analysis that the degradation products of the hydroxyapatite/silk fibroin composite material provided by the present invention in the human body are non-toxic and non-irritating products: the degradation products of the silk fibroin are amino acids and water, which can be absorbed by the human body; while the hydroxyapatite is the main component of human bone, the degradation products thereof are phosphate and calcium ions, which are non-toxic and can be metabolized out of the body, so the screws made of hydroxyapatite/silk fibroin composite material can completely avoid the risk of local inflammation caused by PLA screws when used.

Comparative Embodiment 1

The difference from the embodiment 1 is that in this comparative embodiment, the hydroxyapatite nanoparticles and silk fibroin are dispersed in the hexafluoroisopropanol at one time, and the hexafluoroisopropanol dispersion of the hydroxyapatite and silk fibroin is not performed heat treatment.
(1) 5 g of silk fibroin protein powder is taken, 2.25 g of hydroxyapatite nanoparticles is added, and a vortex mixer and an ultrasonic oscillator are adopted to mix thoroughly.
(2) The mixture of the hydroxyapatite nanoparticles and silk fibroin powder is evenly dispersed in 20 mL of the hexafluoroisopropanol, and thoroughly mixed with the vortex mixer and the ultrasonic oscillator to obtain a hexafluoroisopropanol dispersion of hydroxyapatite and silk fibroin.
(3) Molding: at room temperature, the hexafluoroisopropanol dispersion of the hydroxyapatite and silk fibroin is poured into the mold adopted in the embodiment 1, the end A is opened, the end B is closed, and the mold is vertically immersed in the methanol with the opening facing up and let stand for 5 days; and the mold is turned upside down 180°, the end A is closed, the end B is opened, the mold is vertically immersed in the methanol with the opening facing up and let the mold stand for 5 days.
(4) The mold is removed, the formed silk fibroin/hydroxyapatite composite material is air-dried, and finally machined into 45 mm semi-threaded screws.

The experiment finds that when the hydroxyapatite nanoparticles accounted for 31 wt % of the total amount of the hydroxyapatite nanoparticles and silk fibroin, the rod prepared in the embodiment 1 is straight and slender, and the rod prepared in the comparative embodiment 1 is bent during the molding process, and due to the poor mechanical properties, the rod is broken in the middle during the air-drying process. According to the analysis, a plurality of mixing and heat preservation at 55° C. in the embodiment 1 enable the hydroxyapatite nanoparticles to be fully mixed and dissolved, avoiding the agglomeration of the hydroxyapatite nanoparticles into micron-scale, thereby avoiding the problem of uneven hydroxyapatite/silk fibroin mixture, on the other hand, the heat preservation at 55° C. avoids the problem of uneven dispersion of the hydroxyapatite caused by the silk fibroin due to low-temperature gelation.

Comparative Embodiment 2

Different from the embodiment 1, this comparative embodiment adopts a traditional mold, which can only be opened at one end and has a relatively thick diameter.
(1) 5 g of silk fibroin powder is taken, 2.25 g of hydroxyapatite nanoparticles is added, and a vortex mixer and an ultrasonic oscillator are adopted to mix thoroughly.
(2) 7.25 g of mixture of the hydroxyapatite nanoparticles and silk fibroin obtained by step (1) are evenly dispersed in the 20 mL hexafluoroisopropanol, then let stand in an oven at 55° C. for 0.5 h to completely dissolve the hydroxyapatite nanoparticles and silk fibroin powder and remove air bubbles, so as to obtain a uniform mixture of hydroxyapatite nanoparticles, silk fibroin and hexafluoroisopropanol.
(3) The uniform mixture of the hydroxyapatite nanoparticles, silk fibroin and hexafluoroisopropanol is taken out of the oven, added 5 g of silk fibroin powder and 2.25 g of hydroxyapatite nanoparticles, added 20 mL of hexafluoroisopropanol after mixing uniformly, then kept standing in the oven at 55° C. for 0.5 h after mixing uniformly to obtain a uniform mixture of hydroxyapatite nanoparticles, silk fibroin and hexafluoroisopropanol; and this step is repeated 3 times to obtain a sufficient amount of completely dissolved uniform mixture.
(4) The mixture is let stand in the oven at 55° C. for another 2.5 h to ensure that the solution after mixing is completely mixed and the air bubbles are removed to obtain a viscous and uniform silk fibroin/hydroxyapatite solution.
(5) Molding: the silk fibroin/hydroxyapatite solution is poured into a traditional mold at 55° C. At room temperature, the traditional mold is vertically immersed in methanol with the opening facing up, and let stand for 10 days.
(6) The mold is removed, the formed silk fibroin/hydroxyapatite composite material is air-dried to obtain a rod, and finally machined into semi-threaded screws.

The rod prepared in the embodiment 1 with the hydroxyapatite nanoparticles accounted for 31 wt % of the total amount of hydroxyapatite nanoparticles and silk fibroin and the rod prepared in the comparative embodiment 2 are taken and sliced at 2 mm, and then 200× and 2000× scanning electron microscopes are adopted to photograph the two groups of slices respectively. FIG. 4 shows the 200× section SEM image of the rod prepared in the embodiment 1, it can be observed that the rod is evenly distributed with many longitudinal pores; and FIG. 5 shows the 2000× section SEM image of the rod prepared in the embodiment 1, it can be seen from FIG. 5 that the diameter of the longitudinal pores of the rod is 2 to 10 μm, and the part without pores is flat. The size of the pores is close to that of human cells, which is conducive to the growth of bone cells and can promote the growth of bone cells. As the material degrades and bone cells grow in, the pores will further enlarge, allowing more bone cells to grow in, so the rod has osteoinductive properties. FIG. 6 shows a 200×SEM image taken by the transverse section (the head of the screw vertically downwards) of the rod prepared in the comparative embodiment 2, it can be seen that the rod prepared in comparative embodiment 2 has irregular and uneven distribution of pores on the transverse section, and the pores cannot be observed in many parts. FIG. 7 shows a 2000×SEM image taken by the transverse section (the head of the screw vertically downwards) of the rod prepared in the comparative embodiment 2, it can be seen from FIG. 7 that the rod has very few pores and is uneven, and this structure is difficult to induce the bone cells to grow into, so the rod does not have osteoinductivity properties. According to the analysis, in the embodiment 1, when the rod is formed, the methanol enters the material from the end A of the mold, and replaces the hexafluoroisopropanol in the material from top to bottom, so the internal pores are relatively regular. After the rod is basically formed, the rod is turned upside down, the methanol enters the material from the end B of the mold, and replaces the hexafluoroisopropanol in the rod from top to bottom, thus making the structure of the head and tail of the rod regular and uniform. While the rod of the comparative embodiment 2 is molded, since the methanol can only penetrate into the material from the upper opening of the mold, and cannot penetrate into the bottom of the long mold to replace the hexafluoroisopropanol in the material, so when preparing a longer rod, the upper and lower ends of the rod are unevenly formed, and the formed rod is not easy to be processed into the screw, resulting in a great waste of materials. At the same time, due to the large diameter of the traditional mold, the molding is not completely top-down. The methanol will randomly diffuse in the horizontal direction and replace the hexafluoroisopropanol after entering the material, resulting in irregular internal pores of the formed rod, which is not suitable for the growth of bone cells. To sum up, the openable long cylindrical mold at both ends of the present invention and the upside-down molding process make the rods have more regular internal pores, which allows the cells to grow in, increases the biocompatibility of the cells, and creates osteoinductivity.

The above-mentioned are only the embodiments of the present invention, so that those skilled in the art may understand or implement the present invention. For those skilled in the art, various modifications to these embodiments will be obvious, and the general principles defined herein may be implemented in other embodiments without departing from the spirit or scope of the present invention. Therefore, the present invention will not be limited to the embodiments shown in this document, but will be subject to the widest scope consistent with the principles and novel features applied herein.

The invention claimed is:

1. A preparation method of a silk fibroin/hydroxyapatite composite material, comprising:
   (1) maintaining a uniform mixture of hydroxyapatite nanoparticles, silk fibroin, and hexafluoroisopropanol at a temperature range from 50° C. to 60° C. for at least 3 hours to obtain a viscous silk fibroin/hydroxyapatite solution;
   (2) pouring the silk fibroin/hydroxyapatite solution into a long cylindrical mold; and two ends of the long cylindrical mold being respectively an end A and an end B;
   (3) at room temperature, making the end A opened and the end B closed, vertically immersing the mold in methanol with the opening facing up and letting the mold stand for at least 2 days; and turning the mold upside down, making the end A closed and the end B opened, vertically immersing the mold in the methanol with the opening facing up and letting the mold stand for at least 2 days; and
   (4) removing the mold, and performing ventilation and drying to obtain a silk fibroin/hydroxyapatite composite material.

2. The preparation method of the silk fibroin/hydroxyapatite composite material according to claim 1, wherein the uniform mixture is prepared through the following method:
   (i) mixing the hydroxyapatite nanoparticles and silk fibroin, evenly dispersing them in the hexafluoroisopropanol, and maintaining them at a temperature range from 50° C. to 60° C. for at least 0.5 hour; and
   (ii) performing the following operation at least once: adding the hydroxyapatite nanoparticles, silk fibroin, and hexafluoroisopropanol in equal proportion to in step (i), and maintaining them at a temperature range from 50° C. to 60° C. for at least 0.5 hour after mixing.

3. The preparation method of the silk fibroin/hydroxyapatite composite material according to claim 2, wherein the hydroxyapatite nanoparticles account for 25 wt % to 35 wt % of the total amount of the hydroxyapatite nanoparticles and silk fibroin.

4. The preparation method of the silk fibroin/hydroxyapatite composite material according to claim 3, wherein the hydroxyapatite nanoparticles account for 31 wt % of the total amount of the hydroxyapatite nanoparticles and silk fibroin.

5. The preparation method of the silk fibroin/hydroxyapatite composite material according to claim 2, wherein a particle size of the hydroxyapatite nanoparticles is 60 nm to 80 nm; and a particle size of the silk fibroin is 0.1 mm to 1.5 mm.

6. The preparation method of the silk fibroin/hydroxyapatite composite material according to claim 2, wherein the total amount of the hydroxyapatite nanoparticles and silk fibroin added per 100 ml of the hexafluoroisopropanol is 30 g to 40 g.

7. The preparation method of the silk fibroin/hydroxyapatite composite material according to claim 1, wherein the temperature in step (1) is 55° C.

8. The preparation method of the silk fibroin/hydroxyapatite composite material according to claim 1, wherein the hydroxyapatite nanoparticles account for 25 wt % to 35 wt % of the total amount of the hydroxyapatite nanoparticles and silk fibroin.

9. The preparation method of the silk fibroin/hydroxyapatite composite material according to claim 8, wherein the hydroxyapatite nanoparticles account for 31 wt % of the total amount of the hydroxyapatite nanoparticles and silk fibroin.

10. The preparation method of the silk fibroin/hydroxyapatite composite material according to claim 1, wherein a particle size of the hydroxyapatite nanoparticles is 60 nm to 80 nm; and a particle size of the silk fibroin is 0.1 mm to 1.5 mm.

11. The preparation method of the silk fibroin/hydroxyapatite composite material according to claim 1, wherein the total amount of the hydroxyapatite nanoparticles and silk fibroin added per 100 mL of the hexafluoroisopropanol is 30 g to 40 g.

* * * * *